US006435285B1

(12) United States Patent
Tsai

(10) Patent No.: US 6,435,285 B1
(45) Date of Patent: Aug. 20, 2002

(54) STRUCTURE FOR ENHANCING TORQUE OUTPUT OF ELECTRIC DRILL

(76) Inventor: Feng-Chun Tsai, No. 1, Alley 2, Lane 19, Shulin 8th St., Taoyuan (TW)

( * ) Notice: Subject to any disclaimer, the term of this patent is extended or adjusted under 35 U.S.C. 154(b) by 0 days.

(21) Appl. No.: 10/035,142

(22) Filed: Jan. 4, 2002

(51) Int. Cl.[7] ............................ B25D 11/00; B23Q 5/00
(52) U.S. Cl. ..................... 173/178; 173/216; 192/223.2
(58) Field of Search ................................ 173/178, 176, 173/216, 217; 81/474, 470; 192/37, 38, 223.2, 44

(56) References Cited

U.S. PATENT DOCUMENTS 5,346,022 A * 9/1994 Krivec ....................... 173/178
5,947,254 A * 9/1999 Jones ...................... 192/223.2
6,142,243 A * 11/2000 Mayer ....................... 173/176
6,279,714 B1 * 8/2001 Hsu ....................... 192/223.2
6,738,469 * 8/2001 Hsu ........................... 408/139
6,338,404 B1 * 1/2002 Chen .......................... 173/178

* cited by examiner

*Primary Examiner*—Scott A. Smith
(74) *Attorney, Agent, or Firm*—Bacon & Thomas, PLLC

(57) ABSTRACT

A structure for enhancing torque output of an electric drill includes a torque output unit mounted in an inner housing of a torque control unit. The torque output unit includes an intermediate washer located between an internal gear and a locating gear ring to isolate other components behind it from any backward transmitted reaction force that is generated when the electric drill operates, making it possible to use economical plastic instead of expensive powder metallurgic locating gear ring and pinions, and to snap-fit instead of screwing a motor bedplate to a rear end of the inner housing. The locating gear ring is provided with stop lugs to engage with open recesses provided on the inner housing and the internal gear, preventing slippage of the torque output unit in the inner housing even at a large torque output.

2 Claims, 4 Drawing Sheets

STRUCTURE FOR ENHANCING TORQUE OUTPUT OF ELECTRIC DRILL

BACKGROUND OF THE INVENTION

1. Field of the Invention

The present invention relates to a structure for enhancing torque output of an electric drill, in which a locating gear ring is included in a torque output unit and provided with stop lugs to engage with open recesses provided on an internal gear of the torque output unit and on an inner housing of a torque control unit, so that the torque output unit and the torque control unit are firmly held to each other without the risk of slippage even at a large torque output; and an intermediate washer is positioned between the internal gear and the locating gear ring of the torque output unit to isolate rear parts of the electric drill from any reaction force generated and backward transmitted during operation of the electric drill, making it possible to snap-fit instead of screwing a motor bedplate to the torque control unit and enclose the torque output unit in the torque control unit-at reduced assembling cost.

2. Description of the Prior Art

A conventional electric drill typically includes a torque control unit A1 and a torque output unit A2. Please refer to FIG. 1. The torque control unit A1 includes a torque control member All mounted to a front end of an inner housing A10; and the torque output unit A2 is mounted in the inner housing A10 and includes from front to rear side a main shaft A21, an internal gear A22, a first group of powder metallurgic pinions A23, a transmission gear disc A25, a second group of powder metallurgic pinions A27, a motor bedplate A28, and a motor gear A29 for transmitting power from a motor to the torque output unit. The main shaft A21 has a front end rotatably connected to the torque control unit A1. The first group of powder metallurgic pinions A23 are supported on pins A211 provided at a rear end of the main shaft A21 to locate in and mesh with an internally toothed wall of the internal gear A22. The transmission gear disc A25 includes a front gear portion that forward extends to locate among and mesh with the first group of powder metallurgic pinions A23, and rearward extended pins A251 that support the second group of powder metallurgic pinions A27 thereon. The motor bedplate A28 is then screwed to the rear end of the inner housing A10 with fastening means to enclose the entire torque output unit A2 in the inner housing A10.

To avoid the motor bedplate A28 from direct contact with the second group of powder metallurgic pinions A27 in front of it to cause any damage due to friction, a washer A281 is positioned between the pinions A27 and the motor bedplate A28.

Please refer to FIG. 2. When the electric drill is switched on, power generated by a motor is transmitted via the motor gear A29 to the second group of powder metallurgic pinions A27 that mesh with the motor gear A29, so that the transmission gear disc A25, the first group of powder metallurgic pinions A23, the internal gear A22, and the main shaft A21 work synchronously to output a torsion force.

The conventional electric drill with the above-described torque output structure has the following disadvantages and therefore does not work as well as it is expected:

1. The torque output unit A2 is in the form of an integral assembly that does not effectively prevent transmission of stress and therefore results in considerable damage to internal components of the electric drill due to the stress.

2. With the integral assembly of the torque output unit A2, an overly high reaction force is generated when the electric drill is in use. The high reaction force tends to spring the motor bedplate and necessitates fixing of the motor bedplate to the inner housing with screws. Therefore, increased time and labor costs for assembling the motor bedplate are required.
3. There is not any isolating member between the internal gear and the powder metallurgic pinions, and both the first and the second groups of pinions are located in and mesh with the internal gear to subject to a direct load. It is therefore necessary to produce the internal gear and the pinions through powder metallurgy at increased material cost.
4. The conventional internal gear has large axial size and is produced through powder metallurgy, and therefore requires increased material cost. In the above-described structure, the torsional force output by the torque output unit A2 is transmitted to the torque control unit A1 through engagement of steel balls A101 inside the inner housing A10 with a toothed portion A221 at the front end of the internal gear A22. This type of engagement is able to bear torque output from first to twentieth gear without causing slippage of the steel balls A101 in the toothed portion A221 of the internal gear A22. However, when the torque control unit A1 is adjusted to produce a torsional force higher than the twentieth gear, the steel balls A101 slip in the toothed portion A221 of the internal gear A22 to reduce the performance of the electric drill.

It is therefore desirable to develop a structure for enhancing torque output of electric drill to eliminate drawbacks existing in the conventional electric drill.

SUMMARY OF THE INVENTION

A primary object of the present invention is to provide a structure for enhancing torque output of electric drill to solve the problem of damaged components due to backward transmitted reaction force when the electric drill operates. To achieve this object, the structure of the present invention includes a locating gear ring behind the internal gear and an intermediate washer located between the internal gear and the locating gear ring. The intermediate washer effectively isolates power components at rear part of the electric drill from reaction force generated and backward transmitted when the electric drill is operating, and thereby protects the power components against damage due to any stress.

Another object of the present invention is to provide a structure for enhancing torque output of electric drill, in which the internal gear has a reduced axial size due to inclusion of the locating gear ring in the whole structure. That is, the powder metallurgic internal gear may be produced at reduced material cost.

A further object of the present invention is to provide a structure for enhancing torque output of electric drill, in which the intermediate washer isolates the motor bedplate from the reaction force of the electric drill in operating, making it possible to snap-fit the motor bedplate to the inner housing to save material and time for producing and threading screws for fastening the motor bedplate to the inner housing.

A still further object of the present invention is to provide a structure for enhancing torque output of electric drill, in which the intermediate washer isolates the second group of pinions from the reaction force of the electric drill in operating, making it possible to use the locating gear ring and the second group of pinions made of less strong plastic material. The plastic material is less expensive and the cost for injection molding of plastics is lower than the powder metallurgy, enabling the electric drill to be produced at reduced cost.

A still further object of the present invention is to provide a structure for enhancing torque output of electric drill to overcome the problem of slipped internal gear when an overly high torsional force is output. To achieve this object, the internal gear and the inner housing are provided on outer and inner wall surfaces, respectively, with open recesses, and the locating gear ring is provided on its outer wall surface with stop lugs for engaging with the open recesses on the internal gear and the inner housing, such that the internal gear is firmly held to the inner housing without the risk of slippage even at a high torque output.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
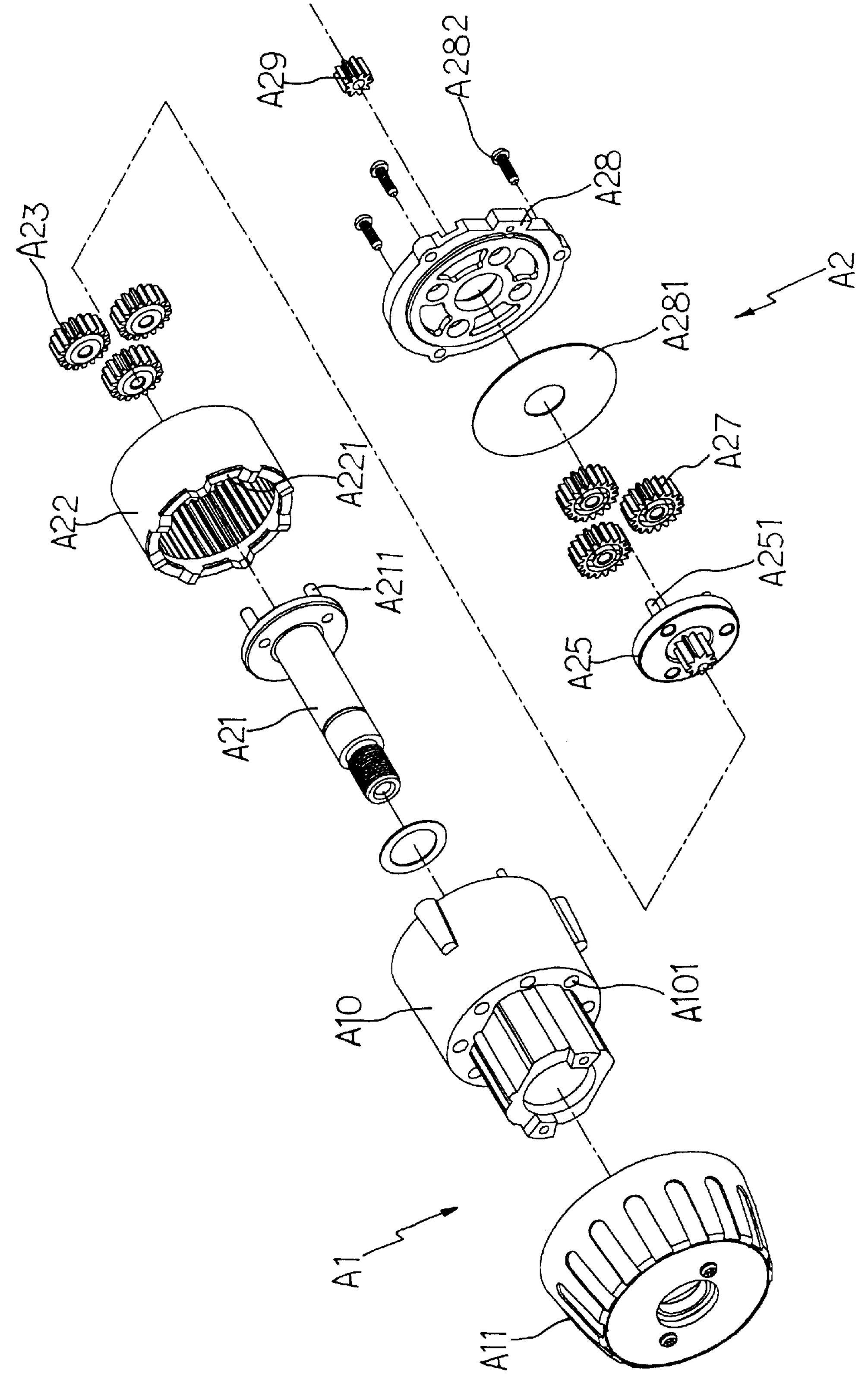
FIG. 1 is an exploded perspective view of a conventional torque control and output structure for an electric drill.
Figure 2:
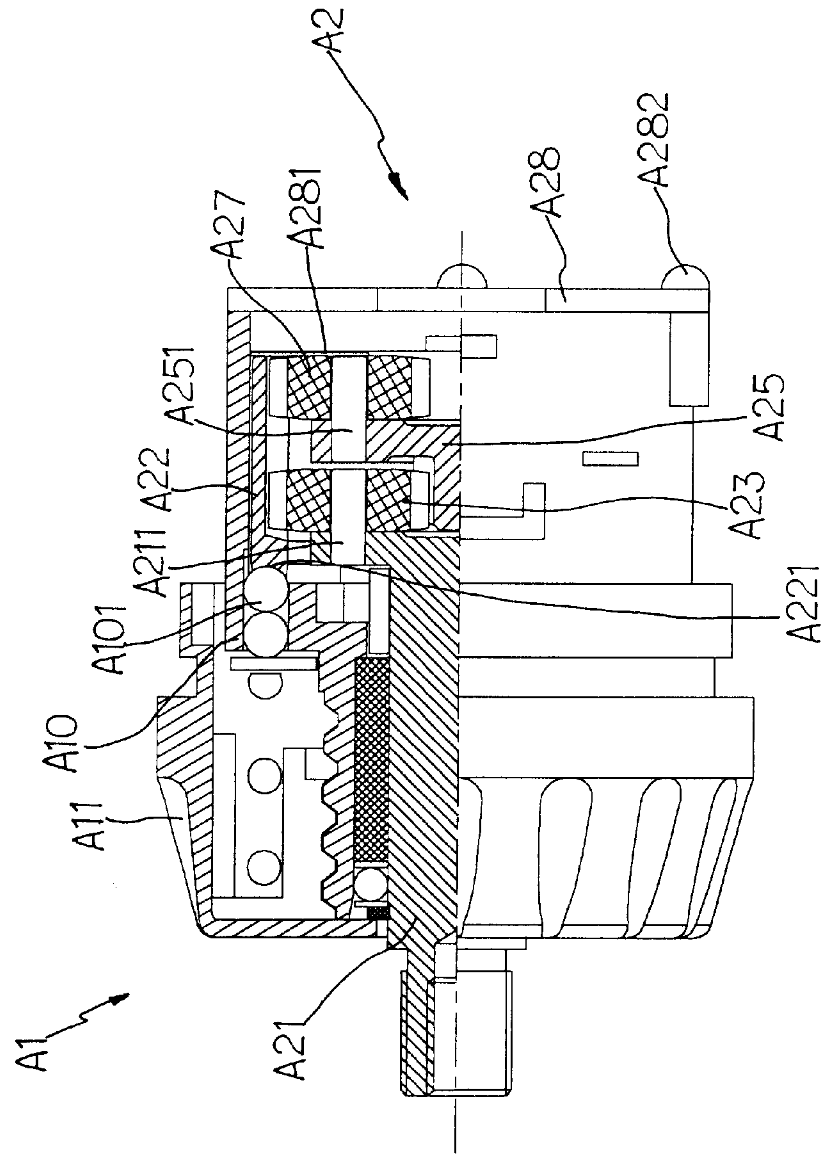
FIG. 2 is an assembled and partially sectioned plan view of FIG. 1.
Figure 3:
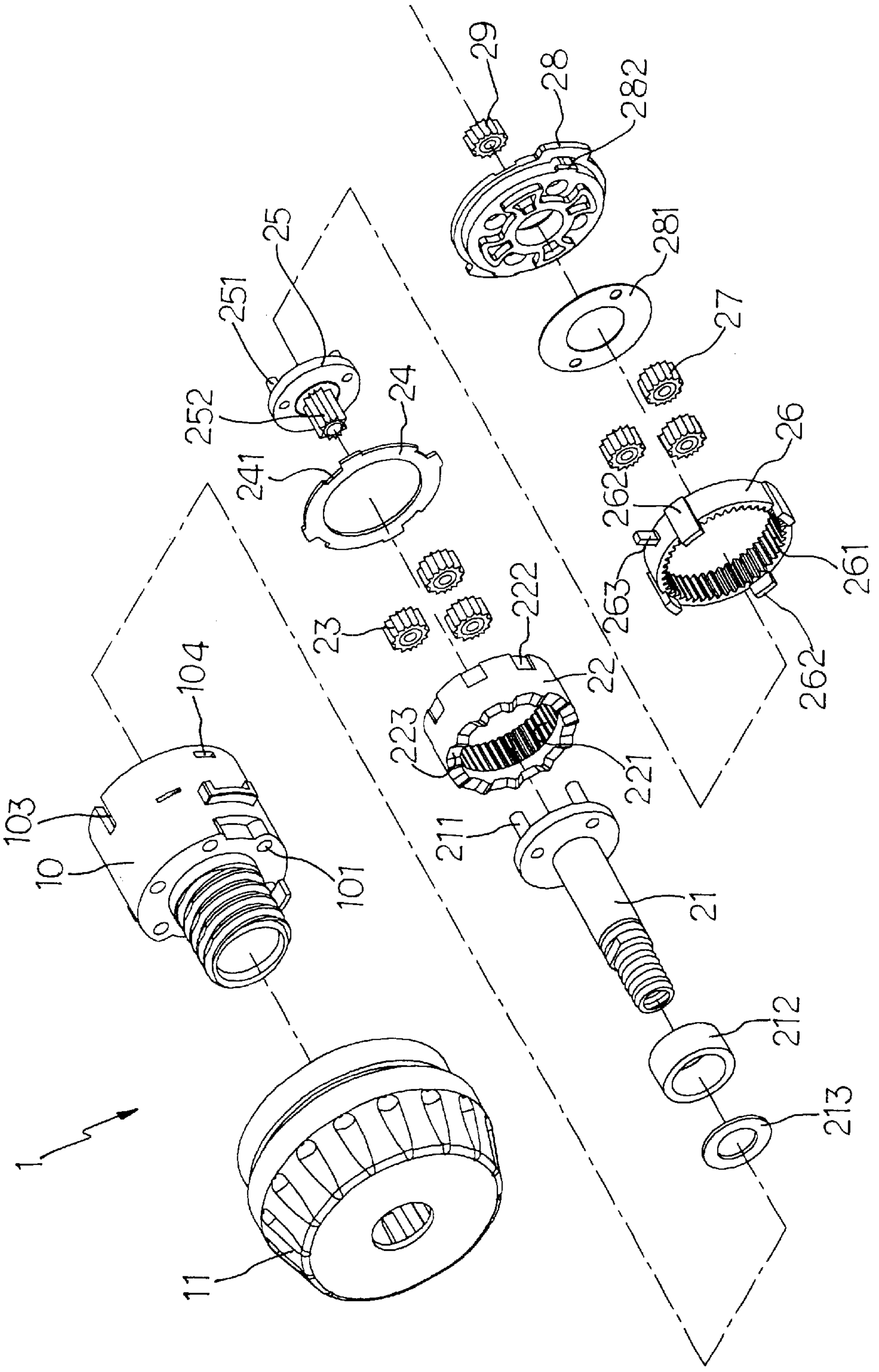
FIG. 3 is an exploded perspective view of a structure for enhancing torque output of an electric drill according to the present invention.
Figure 4:
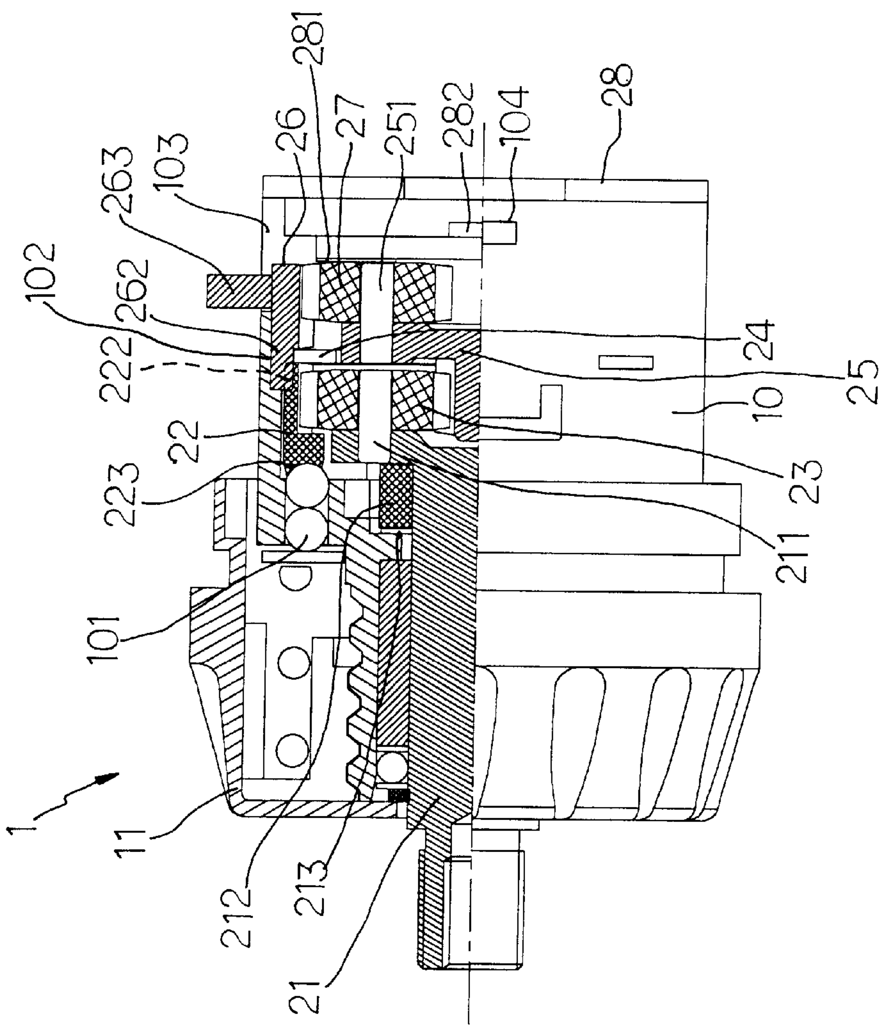
FIG. 4 is an assembled and partially sectioned plan view of FIG. 3.

Please refer to FIGS. 3 and 4 that are exploded perspective view and assembled and partially sectioned plan view, respectively, of a structure for enhancing torque output of an electric drill according to the present invention. As shown, the structure of the present invention mainly includes a torque control unit 1 and a torque output unit 2.

The torque control unit 1 includes an inner housing 10 and a torque control member 11 movably connected to a front of the inner housing 10. A user may control the torque output of the electric drill depending on actual need via turning of the torque control member 11.

The torque output unit 2 includes a main shaft 21, an internal gear 22, a group of three powder metallurgic pinions 23, an intermediate washer 24, a transmission gear disc 25, a locating gear ring 26, a group of three plastic pinions 27, a motor bedplate 28, a motor bedplate washer 281 located at a front side of the motor bedplate 28, and a transmission gear 29 located at a rear side of the motor bedplate 28.

A front portion of the main shaft 21 has a collar 212 and a washer 213 sequentially mounted therearound and forward extends beyond the inner housing 10 and the torque control member 11 of the torque control unit 1. Three axially extended pins 211 are equally spaced on a rear end surface of the main shaft 21 to support the group of three powder metallurgic pinions 23 thereon, so that the pinions 23 are located in the internal gear 22 to mesh with teeth 221 provided along an internal wall surface of the internal gear 22. The intermediate washer 24 is located behind the internal gear 22 to isolate components behind the intermediate washer 24 from any backward transmitted reaction force that is generated during operation of the electric drill. The transmission gear disc 25 is located behind the intermediate washer 24 with a front gear portion 252 of the gear disc 25 forward projected beyond the intermediate washer 24 to mesh with the group of powder metallurgic pinions 23. Three pins 251 axially extend backward from a rear side of the transmission gear disc 25 to support the group of plastic pinions 27 thereon, so that the plastic pinions 27 are located in the locating gear ring 26 and mesh with teeth 261 provided along an inner wall surface of the locating gear ring 26. The motor bedplate 28 is closed onto a rear end of the inner housing 10 to locate behind the locating gear ring 26. The motor bedplate washer 281 is particularly provided between the motor bedplate 28 and the locating gear ring 26 to avoid direct frictional contact of the plastic pinions 27 with the motor bedplate 28 that would result in failed or damaged electric drill. The transmission gear 29 is located among and meshes with the plastic pinions 27 to transmit power from a motor (not shown) to components included in the torque output unit 2 of the electric drill for the same to drill holes.

The present invention is characterized in that the internal gear 22 is provided on its outer wall surface with a plurality of open recesses 222, and the inner housing 10 is provided on its inner wall surface with a plurality of open recesses 102 corresponding to the open recesses 222, and that the locating gear ring 26 is provided on its outer wall surface with a plurality of stop lugs 262 corresponding to the open recesses 222 and 102 on the internal gear 22 and the inner housing 10, respectively. As mentioned above, there is an intermediate washer 24 located between the internal gear 22 and the locating gear ring 26 to isolate rear components from any backward transmitted reaction force. Thus, the intermediate washer 24 is also provided along its circumferential edge with a plurality of dents 241 corresponding to the open recesses 222, 102 and the stop lugs 262. The internal gear 22 and the inner housing 10 are held to each other by the locating gear ring 26 through engagement of the stop lugs 262 with the aligned open recesses 102, 222 and dents 241. Slippage of the internal gear 22 in the inner housing 10 at high torque output can therefore be avoided.

Since the provision of the intermediate washer 24 isolates the motor bedplate 28 from the backward transmitted reaction force, it is possible to connect the motor bedplate 28 to the inner housing 10 in a simpler snap-fitting manner. More specifically, the motor bedplate 28 is provided at two diametrically opposite sides with two projections 282, and the inner housing 10 is provided at two diametrically opposite sides of a rear edge thereof with two retaining holes 104 corresponding to the two projections 282, so that the motor bedplate 28 could be snap-fitted onto the rear end of the inner housing 10 through engagement of the projections 282 with the retaining holes 104 without the risk of easily separating from the inner housing 10. With the above-described arrangements, less material and labor is needed in manufacturing and assembling the electric drill to upgrade the efficiency and performance thereof.

Please refer to FIG. 4. Each of the stop lugs 262 provided on the outer wall surface of the locating gear ring 26 is raised from the outer wall surface by a predetermined small height for extending into a corresponding one of the open recesses 102 provided on the inner wall surface of the inner housing 10 and thereby holding the inner housing 10 to the locating gear ring 26. Moreover, a portion of each stop lug 262 axially projected from a front circumferential edge of the locating gear ring 26 is radially inward extended by a predetermined small distance to have an increased thickness than other portions of the stop lug 262. The thickness-increased front portions of the stop lugs 262 are seated in the open recesses 222 on the outer wall surface of the internal gear 22 and thereby hold the internal gear 22 to the locating gear ring 26. These arrangements eliminate the risk of a slipped internal gear 22 in the inner housing 10 and enable steel balls 101 provided at the front end of the inner housing 10 to always firmly engage with a toothed front edge 223 of the internal gear 22 even at a considerably large torque output of the electric drill.

The locating gear ring 26 is also provided on a top of its outer wall surface with a radially outward projected locating block 263 for extending into a locating cut 103 correspondingly provided on the rear edge of the inner housing 10, so that the locating gear ring 26 is limited to move axially and horizontally relative to the inner housing 10.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A structure for enhancing torque output of electric drill, comprising a torque control unit and a torque output unit;

said torque control unit including an inner housing into which said torque output unit is mounted, and a torque control member movably connected to a front end of said inner housing for adjusting a magnitude of torque output of said torque output unit;

said torque output unit including a main shaft having a first group of three pinions supported on a rear end thereof, an internal gear housing and meshing with said first group of three pinions, an intermediate washer located behind said first group of three pinions, a transmission gear disc having a front gear portion forward extended through said intermediate washer to locate among and mesh with said first group of three pinions and having a second group of three pinions supported on a rear end thereof, an internally toothed locating gear ring located behind said internal gear and housing said transmission gear disc and said second group of pinions, a motor bedplate connected to a rear end of said inner housing of said torque control unit, a motor bedplate washer located between said motor bedplate and said second group of pinions, and a motor transmission gear located among and meshing with said second group of pinions;

said structure for enhancing torque output of electric drill being characterized in that said internal gear of said torque output unit is provided on an outer wall surface with a plurality of circumferentially spaced first open recesses, said inner housing of said torque control unit is provided on an inner wall surface with a plurality of second open recesses corresponding to said first open recesses, said intermediate washer is provided along its circumferential edge with dents corresponding to said first and said second open recesses, and said locating gear ring is provided on an outer wall surface with a plurality of stop lugs corresponding to and thereby engaging with said first and said second open recesses and said dents to hold said torque output unit to said torque control unit without the risk of slippage of said internal gear in said inner housing even at a large torque output of the torque output unit; and that said intermediate washer isolates components of said torque output unit behind said intermediate washer from backward transmitted reaction force when said electric drill operates, making it possible to produce said second group of pinions with economical injection-molded plastic material instead of expensive powder metallurgy, and to quickly connect said motor bedplate to said inner housing simply by providing two diametrically opposite projections on said motor bedplate for snap-fitting into two diametrically opposite retaining holes on the rear edge of said inner housing.

2. The structure for enhancing torque output of electric drill as claimed in claim 1, wherein said locating gear ring is provided on a top of the outer wall surface with a radially outward projected locating block for extending into a locating cut correspondingly provided at the rear edge of said inner housing, so that said locating gear ring is limited to move axially and horizontally relative to said inner housing.

* * * * *